United States Patent
Lee et al.

(10) Patent No.: US 8,364,736 B2
(45) Date of Patent: Jan. 29, 2013

(54) MEMORY-BASED FFT/IFFT PROCESSOR AND DESIGN METHOD FOR GENERAL SIZED MEMORY-BASED FFT PROCESSOR

(75) Inventors: Chen-Yi Lee, Hsinchu (TW); Chen-Fong Hsiao, Hsinchu (TW); Yuan Chen, Hsinch (TW)

(73) Assignee: National Chiao Tung University, Hsinchu (TW)

( * ) Notice: Subject to any disclaimer, the term of this patent is extended or adjusted under 35 U.S.C. 154(b) by 1091 days.

(21) Appl. No.: 12/325,516

(22) Filed: Dec. 1, 2008

(65) Prior Publication Data

US 2010/0017452 A1 Jan. 21, 2010

(30) Foreign Application Priority Data

Jul. 16, 2008 (CN) .......................... 2008 1 0131540

(51) Int. Cl.
*G06F 17/14* (2006.01)
(52) U.S. Cl. ...................................................... 708/404
(58) Field of Classification Search .................. None
See application file for complete search history.

(56) References Cited

U.S. PATENT DOCUMENTS

| | | | |
|---|---|---|---|
| 4,477,878 A | 10/1984 | Cope | |
| 5,091,875 A | 2/1992 | Wong et al. | |
| 6,728,742 B1* | 4/2004 | Hertz | 708/404 |
| 7,062,523 B1 | 6/2006 | Hoffman et al. | |
| 7,164,723 B2 | 1/2007 | Sunwoo | |
| 2006/0253514 A1 | 11/2006 | Yu | |
| 2007/0239815 A1* | 10/2007 | Cousineau et al. | 708/404 |
| 2008/0025199 A1 | 1/2008 | Yang et al. | |
| 2008/0228845 A1* | 9/2008 | Chang | 708/405 |
| 2010/0030831 A1* | 2/2010 | Standfield | 708/404 |
| 2010/0128818 A1* | 5/2010 | Shepherd et al. | 375/316 |

FOREIGN PATENT DOCUMENTS

| | | |
|---|---|---|
| CN | 01140060.9 | 5/2002 |
| CN | 03107204.6 | 4/2004 |
| CN | 200410090873.2 | 5/2006 |
| CN | 200610104144.7 | 2/2007 |
| CN | 200710044716.1 | 3/2008 |

OTHER PUBLICATIONS

Yang et al. "Design of a 3780-Point Processor for TDS-OFDM," IEEE Transactions on Broadcasting, Mar. 2002, pp. 57-61, vol. 48—No. 1.

(Continued)

*Primary Examiner* — David H Malzahn
(74) *Attorney, Agent, or Firm* — Muncy, Geissler, Old & Lowe, PLLC

(57) ABSTRACT

For a large size FFT computation, this invention decomposes it into several smaller sizes FFT by decomposition equation and then transform the original index from one dimension into multi-dimension vector. By controlling the index vector, this invention could distribute the input data into different memory banks such that both the in-place policy for computation and the multi-bank memory for high-radix structure could be supported simultaneously without memory conflict. Besides, in order to keep memory conflict-free when the in-place policy is also adopted for I/O data, this invention reverses the decompose order of FFT to satisfy the vector reverse behavior. This invention can minimize the area and reduce the necessary clock rate effectively for general sized memory-based FFT processor design.

9 Claims, 1 Drawing Sheet

OTHER PUBLICATIONS

Johnson, L.G., "Conflict Free Memory Addressing for Dedicated FFT Hardware," IEEE Transactions on Circuits and Systems—II: Analog and Digital Signal Processing, pp. 312-316, May 1992, vol. 396—No. 5.

Jo et al., "New Continuous-Flow Mixed-Radix (CFMR) FFT Processor Using Novel In-Place Strategy," IEEE Transactions on Circuits and Systems—I: Regular Papers, May 2005, pp. 911-919, vol. 52—No. 5.

* cited by examiner

MEMORY-BASED FFT/IFFT PROCESSOR AND DESIGN METHOD FOR GENERAL SIZED MEMORY-BASED FFT PROCESSOR

BACKGROUND OF THE INVENTION

1. Field of the Invention

This invention relates to a memory-based FFT/IFFT processor and design method for general sized memory-based FFT processor to minimize the area and reduce the necessary clock rate.

2. Description of the Related Art

A. Prior Arts List:
1. USA Patent:

| | Pat. No. | Title |
|---|---|---|
| [A1] | 4,477,878 | Discrete Fourier transform with non-tumbled output |
| [A2] | 5,091,875 | Fast Fourier transform (FFT) addressing apparatus and method |
| [A3] | 7,062,523 | Method for efficiently computing a fast Fourier transform |
| [A4] | 7,164,723 | Modulation apparatus using mixed-radix fast Fourier transform |
| [A5] | 20060253514 (Publication No.) | Memory-based Fast Fourier Transform device |
| [A6] | 20080025199 (Publication No.) | Method and device for high throughput n-point forward and inverse fast Fourier transform |

2. China Patent:

| | Pat. No. | Title |
|---|---|---|
| [A7] | 01140060.9 | The architecture for 3780-point DFT processor |
| [A8] | 03107204.6 | The multicarrier systems and method with 3780-point IDFT/DFT processor |
| [A9] | 200410090873.2 (Publication No.) | The oversampling method for 3780-point DFT |
| [A10] | 200610104144.7 (Publication No.) | The 3780-point DFT processor |
| [A11] | 200710044716.1 (Publication No.) | The water-flowed 3780-point FFT processor |

3. Articles

[B1] Z.-X. Yang, Y.-P. Hu, C.-Y. Pan, and L. Yang, "Design of a 3780-point IFFT processor for TDS-OFDM," *IEEE Trans. Broadcast.*, vol. 48, no. 1, pp. 57-61, March 2002.

[B2] L. G. Johnson "Conflict free memory addressing for dedicated FFT hardware," *IEEE Trans. Circuits Syst. II, Analog Digit. Signal Process.*, vol. 39, no. 5, pp. 312-316, May 1992.

[B3] B. G. Jo, and M. H. Sunwoo, "New continuous-flow mixed-radix (CFMR) FFT processor using novel in-place strategy," *IEEE Trans. Circuits Syst. I, Reg. Papers*, vol. 52, no.5, pp. 911-919, May 2005.

B. Description of Prior Arts (1) [A1] could not support the multi-bank memory structure. Hence, for the radix-r computation, it would cost r clock cycles to read data from memory and write the computed data back to memory. This would result in the FFT needs more computation cycle and thus demand higher clock rate for the processor for real-time application. This invention could solve this problem by supporting the multi-bank addressing without memory conflict such that the r data for radix-r could be accessed in one clock cycle.

(2) [A2], [A5], [B2] could only support the fixed radix-r. Hence, it could only be applied in the FFT with the size N=r. If we consider the application that the 3780-point FFT for the Chinese DTV application or the 3072-point FFT for the PLC application, they would not work here. This invention could support any general mixed radix such that it could work for any size FFT application.

(3) [A3] could only support the fixed radix-r, hence, it could not support the Chinese DTV or PLC etc application. Besides, since it could not support multi-bank memory structure, it would need r clock cycles for data access from memory for radix-r computation. Then, it would need higher clock rate for FFT computation than the processor that takes multi-bank memory structure. This invention could not only support variable radix for any size FFT application but also support multi-bank memory structure to reduce necessary clock rate without memory conflict.

(4) [A4], [B3] could only support the radix-2/4 algorithm. Therefore, it could only work for the FFT with the size $N=2^n$. And for the FFT application with the other size such as for the Chinese DTV with N=3780, it would not work. However, this invention could work for all of them since this invention could support any mixed radix. Besides, for the long size FFT processor design such as N=8192, this invention could make the processor design more flexible since the max radix [4] could support is only radix-4 and this invention could support is greater than radix-4.

(5) [A6] describes some candidate decomposition of 3780, for instance, 3780=3×3×3×2×2×5×7. It implements each small size FFT module with the MDC structure to eliminate some large internal buffer in [A7]-[A11]. But, this would cost more hardware since it should finish all the computation within one clock cycle for each module. Besides, for real system application, the in order output data is necessary. However, its output data are not in order output.

(6) [A7], [A8], [A9], [A10], [A11] implement the 3780-point FFT processor with some architecture which is similar to pipeline. Their architecture need large internal buffer to reorder the data for processing. Besides, for the real system application requirement, the in order I/O data and to support continuous data flow are both necessary. In order to achieve this, [A7], [A8] needs at least 3N words; [A9], [A11] needs at least 5N words; [A10] needs 6N words memory size. This invention could achieve this requirement only with 2N memory words. Note that, the output data of [A7], [A8] and [A11] are not in order output, and they need "at least" one N words memory to reorder the output data as in order output.

(7) The output data of the 3780-point FFT processor proposed in [B1] is not in order. In order to achieve this, it would need a buffer to reorder the output data. Hence, the design would need memory size more than 4N words to achieve continuous data flow and in order I/O data. However, this invention only needs 2N words memory.

| Classification of the Prior arts | | | | |
|---|---|---|---|---|
| | [A1] | [A2] [B2] [A5] | [A3] | [A4] [B3] |
| Radix *1 | All general | Fixed radix-r | Fixed radix-r | Radix-2/4 |
| In-place *2 | Yes | Yes | Yes | Yes |
| Memory *3 | 2N words | 2N words | 2N words | 2N words |
| Multi-bank *4 | No | Yes | No | Yes |

*1 The Tab "Radix" means that the butterfly size that the prior patents could support.
*2 The Tab "In-place" means that whether the prior patents support the in-place policy to reduce the necessary memory size.
*3 The Tab "Memory" means that the necessary memory size for the real-time application of the prior patents.
*4 The Tab "Multi-bank" means that whether the prior patent could support the multi-bank memory structure to reduce the necessary clock rate.

SUMMARY OF THE INVENTION

To overcome the drawbacks of the prior arts, this invention proposes a design method of general sized memory-based FFT processor, comprising the steps of: (1) Decomposing a large size FFT computation into several relative smaller sizes FFT by decomposition equation and then transform the original index from one dimension into multi-dimension vector; (2) Controlling the index vector to distribute the input data into different memory banks such that both the in-place policy for computation and the multi-bank memory for high-radix structure could be supported simultaneously without memory conflict; (3) In order to keep memory conflict-free when the in-place policy is also adopted for I/O data, reverses the decompose order of FFT to satisfy the vector reverse behavior; through the steps to minimize the area and reduce the necessary clock rate. This invention also proposes a memory-based FFT/IFFT processor comprising: a main memory to store data; a processing element for decomposed smaller sized FFT computation; a control unit to control: (1) the memory for I/O data and butterflies computation (2) the computation order of smaller sized FFT (3) the memory addressing for data access with in-place policy.

DETAILED DESCRIPTION OF THE PREFERRED EMBODIMENT

Figure 1:
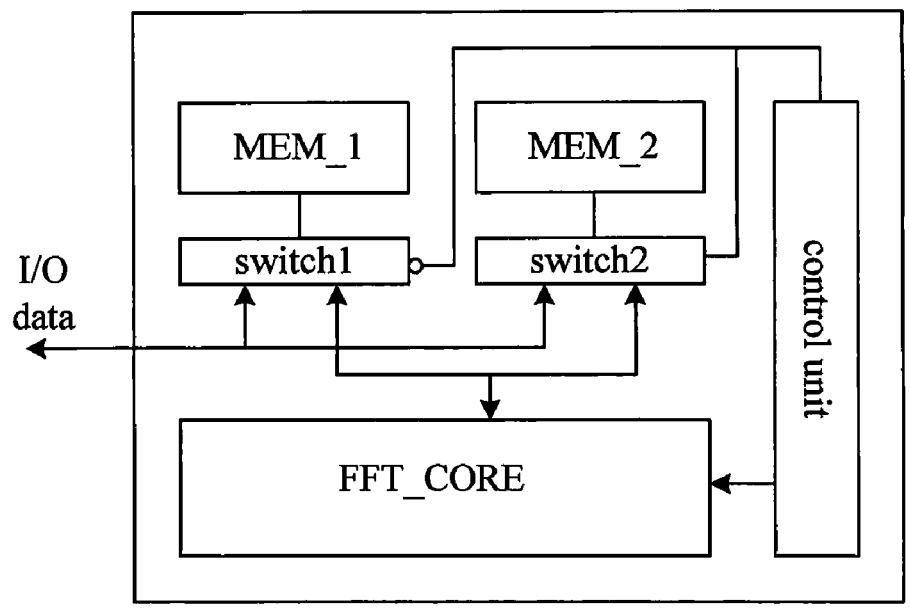
FIG. 1. The design block of FFT processor of this invention.

For the best understanding of this invention, please refer to the following detailed description of the preferred embodiments and the accompanying drawings.

The definition of DFT is $$X(k) = \sum_{n=0}^{N-1} x(n) W_N^{nk}.$$

The method to decompose a larger size DFT into several smaller sizes DFT has been proposed in article C1 [C. Burrus, "Index mappings for multidimensional formulation of the DFT and convolution," *IEEE Trans. Acoust., Speech, Signal Process.*, vol. 25, no. 3, pp. 239-242, June 1977]. Here, the present invention takes the decomposition equation (1) for the size $N=N_1 N_2$ for illustration:

$$\begin{cases} n = N_2 n_1 + A_2 n_2 \bmod N & n_1, k_1 = 0, 1, \ldots, N_1 - 1 \\ k = B_1 k_1 + N_1 k_2 \bmod N & n_2, k_2 = 0, 1, \ldots, N_2 - 1 \end{cases} \quad (1)$$

Eq. (1) maps the index n and k to the index vector $(n_1, n_2)$ and $(k_1, k_2)$, from one dimension $[0, N-1]$ into two dimensions $[0, N_1-1] \times [0, N_2-1]$. The selection of coefficient $A_2$ and $B_1$ depends on the relation between $N_1$ and $N_2$. In this invention, the coefficients for Eq. (1) are employed as follows:

Case I: If $N_1$ and $N_2$ are relative prime, we choose $A_2$ and $B_1$ such that $$A_2 = p_1 N_1 \text{ and } A_2 = q_1 N_2 + 1$$

$$B_1 = P_2 N_2 \text{ and } B_1 = q_2 N_1 + 1$$

Here, $p_1$, $q_1$, $p_2$ and $q_2$ are all positive integers. Then, the definition of DFT could be rewritten as Eq. (2):

$$X(k_1, k_2) = \sum_{n_2} \sum_{n_1} x(n_1, n_2) W_{N_1}^{n_1 k_1} W_{N_2}^{n_2 k_2} \quad (2)$$

$$= \sum_{n_2} \left\{ \sum_{n_1} x(n_1, n_2) W_{N_1}^{n_1 k_1} \right\} W_{N_2}^{n_2 k_2}$$

$$= \sum_{n_2} y(k_1, n_2) W_{N_2}^{n_2 k_2}$$

Case II: If $N_1$ and $N_2$ are not relative prime, we choose $A_2 = B_1 = 1$. Then, the definition of DFT could be rewritten as Eq. (3):

$$X(k_1, k_2) = \sum_{n_2} \sum_{n_1} x(n_1, n_2) W_{N_1}^{n_1 k_1} W_{N_2}^{n_2 k_2} W_N^{n_2 k_1} \quad (3)$$

$$= \sum_{n_2} \left\{ W_N^{n_2 k_1} \sum_{n_1} x(n_1, n_2) W_{N_1}^{n_1 k_1} \right\} W_{N_2}^{n_2 k_2}$$

$$= \sum_{n_2} W_N^{n_2 k_1} y(k_1, n_2) W_{N_2}^{n_2 k_2}$$

Eqs. (2) and (3) imply that a larger size N-point FFT could be computed by two smaller sized $N_1$-point and $N_2$-point FFT in the first and second stages respectively. For the fixed $n_2$, the input data of the $N_1$-point FFT in the first stage are $x(n_1, n_2)$, $n_1 = 0, 1, \ldots, N_1 - 1$. The output data of the first stage correspond to this $n_2$ are $y(k_1, n_2)$, $k_1 = 0, 1, \ldots, N_1 - 1$. For the fixed $k_1$, the input data of the $N_2$-point FFT in the second stage are $y(k_1, n_2)$, $n_2 = 0, 1, \ldots, N_2 - 1$. The output data of the second stage correspond to this $k_1$ are $X(k_1, k_2)$, $k_2 = 0, 1, \ldots, N_2 - 1$. The difference between Eq. (2) and (3) is that if $N_1$ and $N_2$ are not relative prime, there would have twiddle factor $w_N^{n_2 k_1}$ between the first and second stages as shown in Eq. (3).

Now, the present invention considers computing $N_1$-point DFT in the first stage and $N_2$-point DFT in the second stage for the first DFT symbol. The present invention distributes the input data into different memory banks. Suppose $N_2 \geq N_1$ and the memory bank number is $N_2$, then, the input data could be distributed into $N_2$ memory banks by Eq. (4) to achieve memory conflict-free.

$$\text{bank} = n_1 + n_2 \bmod N_2 \quad (4)$$

The key to achieve memory conflict-free is to distribute data into memory bank by Eqs. (1) and (4). Once the memory bank is selected, data need to be addressed. Any two data in the same memory bank should be mapped to different address within the range from 0 to $N_1 - 1$. For simplicity, we choose Eq. (5) for data addressing.

$$\text{address} = n_1 \quad (5)$$

After finishing computing the first DFT symbol, the data should be outputted in order. The output index is mapped by Eq. (4). When the computed DFT symbol data are outputted in order, the input data of the second DFT symbol are also inputted in order simultaneously with the in-place policy. That is, the new input data x(i) should be put in the location of the output data y(i). For the computation of the second DFT symbol, the present invention computes it with the reverse order of the first DFT symbol. The present invention computes the $N_2$-point DFT in the first stage and $N_1$-point DFT in the second stage for the second DFT symbol. After finishing computing the second DFT symbol, the I/O data also adopts the in-place policy. The third DFT symbol would return to the state of the first DFT symbol.

The following, the present invention takes the 3780-point FFT as example for detailed illustration, which has been adopted for the Chinese DTV application. The decomposition order in following is only one of the candidate selections.

Since 3780=4×3×3×3×5×7, we could complete it by computing the 3-point, 4-point, 5-point and 7-point FFT respectively. Here, the data are distributed into 7 memory banks.

First, the present invention takes the decomposition order, 4, 3, 3, 3, 5 and then 7. For the first stage (4-point FFT), the decomposition equation (6) is taken.

$$\begin{cases} n = 945n_1 + 2836\tilde{n}_2 \bmod 3780 & n_1, k_1 = 0, 1, 2, 3 \\ k = 945k_1 + 4\tilde{k}_2 \bmod 3780 & \tilde{n}_2, \tilde{k}_2 = 0, \ldots, 944 \end{cases} \quad (6)$$

It maps the index n to the vector $(n_1,\tilde{n}_2)$ from [0, 3779] to [0, 3]×[0, 944] as shown in Table I

TABLE I

THE INDEX MAPPING FOR THE FIRST STAGE

| | $n_1 = 0$ | $n_1 = 1$ | $n_1 = 2$ | $n_1 = 3$ |
|---|---|---|---|---|
| $\tilde{n}_2 = 0$ | x[0] | x[945] | x[1890] | x[2835] |
| $\tilde{n}_2 = 1$ | x[2836] | x[1] | x[946] | x[1891] |
| $\tilde{n}_2 = 2$ | x[1892] | x[2837] | x[2] | x[947] |
| ... | ... | ... | ... | ... |
| $\tilde{n}_2 = 944$ | x[944] | x[1889] | x[2834] | x[3779] |

The data in each row of Table I are the input data of each 4-point FFT The input order is decided by the index $n_1$. For example, for the row $\tilde{n}_2=1$, the input order is $(n_1, \tilde{n}_2)=(0,1)$, (1,1), (2,1) and (3,1). They correspond to the data x[2836], x[1], x[946] and x[1891] respectively as shown in Table I.

Since the input data of each 4-point FFT has the same index $\tilde{n}_2$, memory conflict could be avoided in the first stage by distributing the data into different memory banks by Eq. (7).

$$\text{bank}=n_1+\text{x} \bmod 7 \quad (7)$$

After the first stage, the original data has been divided into 4 independent groups for four 945-point FFT and correspond to $k_1=0$, 1, 2 and 3 respectively.

Similarly, for the 945-point FFT, we could also decompose it in the order 945=3×3×3×5×7 and map the index $\tilde{n}_2$ to the vector $(n_2, n_3, n_4, n_5, n_6)$ from [0, 944] to [0, 2]×[0, 2]×[0, 2]×[0, 4]×[0, 6]. By combining all the decomposition equations for each stage, the full index mapping equations for the 3780-point FFT in this decomposition order are shown in Eqs. (8) and (9). The bank selection Eq. (10) is taken for memory conflict-free. And, the addressing equation could be taken as Eq. (11).

$$n=945n_1+1260n_2+2940n_3+980n_4+1512n_5+540n_6 \bmod 3780 \quad (8)$$

$$k=945k_1+2380k_2+3360k_3+2520k_4+2268k_5+540k_6 \bmod 3780 \quad (9)$$

$$\text{bank}=n_1+n_2+n_3+n_4+n_5+n_6 \bmod 7 \quad (10)$$

$$\text{address}=135n_1+45n_2+15n_3+5n_4+n_5 \quad (11)$$

After the first FFT symbol, the odd FFT symbol, has been computed, all the indexes $n_i$ would be transformed to $k_i$ in Eqs. (10) and (11). For the second input FFT symbol, the even FFT symbol, since the even FFT input data $x_{even}[n]$ should be put in the location of the odd FFT output data $x_{odd}[k]$ with k=n, its mapping index, memory bank and address should be determined by Eqs. (9), (10) and (11) respectively.

Now, the present invention considers how to keep memory conflict-free under this data distribution for the even FFT symbol.

For the computation of the even FFT symbol, the present invention takes the reverse decomposition order of the odd FFT symbol, 3780=7×5×3×3×3×4. That is, the present invention computes it in the order 7-point, 5-point, 3-point, 3-point, 3-point and 4-point FFT. By the similar approach, the present invention could get the full input and output index mapping Eqs. (12) and (13) for the even FFT symbols just like Eqs. (8) and (9) for the odd FFT symbols. They map the input index n and output index k to the vector $(a_1, a_2, a_3, a_4, a_5, a_6)$ and $(b_1, b_2, b_3, b_4, b_5, b_6)$ respectively from [0, 3779] to [0, 6]×[0, 4]×[0, 2]×[0, 2]×[0, 2]×[0, 3] for the even FFT symbols.

$$n=540a_1+2268a_2+2520a_3+3360a_4+2380a_5+945a_6 \bmod 3780 \quad (12)$$

$$k=540b_1+1512b_2+980b_3+2940b_4+1260b_5+945b_6 \bmod 3780 \quad (13)$$

Comparing the input and output index mapping equation pair (9) with (12) and (8) with (13), the present invention finds that these two equation pairs could match perfectly with the relation, vector reverse, as shown in Eqs. (14) and (15).

$$(a_1, a_2, a_3, a_4, a_5, a_6)=(k_6, k_5, k_4, k_3, k_2, k_1) \quad (14)$$

$$(n_1, n_2, n_3, n_4, n_5, n_6)=(b_6, b_5, b_4, b_3, b_2, b_1) \quad (15)$$

Since the input data of the even FFT symbol $x_{even}[n]$ should be put in the location of the odd computed FFT symbol output data $X_{odd}[k]$ with k=n. Then, the present invention gets Eqs. (16) and (17) for bank selection and memory addressing for the even FFT symbol.

$$\text{bank}=a_1+a_2+a_3+a_4+a_5+a_6 \bmod 7 \quad (16)$$

$$\text{address}=135a_6+45a_5+15a_4+5a_3+a_2 \quad (17)$$

Note the input mapping equation (12) and the output mapping equation (9) are the same. And, the bank selection equations (10) and (16) also keep the same. Thus the memory access would keep conflict-free for the even FFT symbol by computing it with the reverse decomposition order of the odd FFT symbol.

Furthermore, the present invention notes that the output mapping equation (13) and the input mapping equation (8) are also the same. This means that, when the third FFT input data $x_{third}[n]$ is put in the location of the even FFT output data $X_{even}[k]$ with k=n, the distribution of the third FFT input data would be the same with that being determined by Eqs. (8), (10) and (11). It returns to the state of the odd FFT symbol and we have $x_{third}[n]=x_{odd}[n]$.

From above discussion, a conflict-free variable radix FFT processor could be designed by reversing the decomposition order of the previous FFT symbol. It could support the in-place policy for both butterflies output and I/O data simultaneously.

FIG. 1 shows the memory-based 3780-point DFT processor design block diagram. The MEM_1 and MEM_2 are two memory blocks, each block contains 7 memory banks and each bank has 540 words. The FFT_CORE contains the processing element which could process the smaller sized DFT individually. The control unit controls the data access and processing element computation. The following, the present invention describes how the DFT processor work. For convenience, the present invention denotes the decomposition and computation order as type I order: 4-point, 3-point, 3-point, 3-point, 5-point and then 7-point DFT. And, the present invention denotes the reverse order of type I as type II order: 7-point, 5-point, 3-point, 3-point, 3-point and then 4-point DFT.

Suppose the 1$^{st}$ and the 2$^{nd}$ DFT symbols are stored in the memory blocks MEM_1 and MEM_2 respectively. And suppose the decomposition and computation order of the 1$^{st}$ and the 2$^{nd}$ DFT symbol are both in the type I order. Then, from the previous discussion, the present invention has:

(1) the 1$^{st}$, 5$^{th}$, 6$^{th}$, 13$^{th}$, . . . DFT symbols are stored in MEM_1 and computed in type I order.

(2) the 2$^{nd}$, 6$^{th}$, 10$^{th}$, 14$^{th}$, . . . DFT symbols are stored in MEM_2 and computed in type I order. (3) the 3$^{rd}$, 7$^{th}$, 11$^{th}$, 15$^{th}$, . . . DFT symbols are stored in MEM_1 and computed in type II order. (4) the 4$^{th}$, 8$^{th}$, 12$^{th}$, 16$^{th}$, . . . DFT symbols are stored in MEM_2 and computed in type II order.

Figure 2:
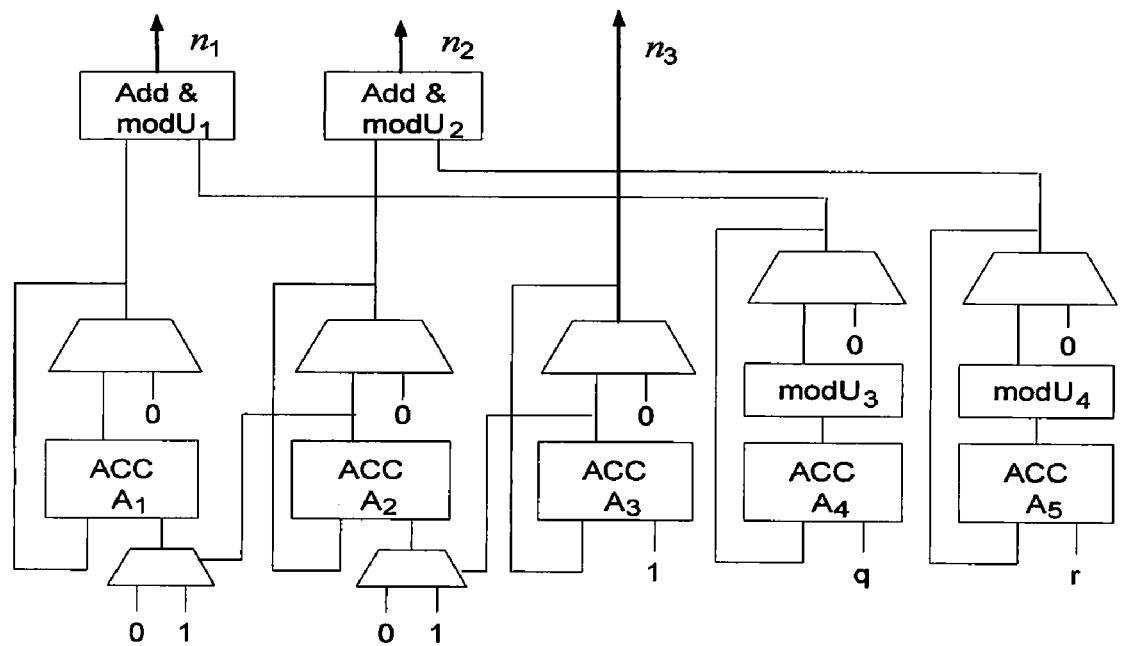
FIG. 2. The index vector generator hardware implementation of this invention.

For convenience, for the hardware implementation to get the index vector for data access, the present invention only shows the implement for the DFT size N=N$_1$N$_2$N$_3$ in FIG. 2. As shown in FIG. 2, it is consists of several accumulators A$_1$, A$_2$, . . . , A$_5$. The parameters U$_1$, U$_2$, U$_3$, U$_4$, q and r are determined by the decomposition equation (1) for each stage.

Table II is the comparison of this invention between different approaches for the real-time application for the memory-based DFT processor design. For [B4], it needs 4N words memory size and is two times of the others. This is because it doesn't adopt the in-place policy for butterflies computation and I/O data. Hence, in order to minimize the necessary memory size, the in-place policy should be adopted for both butterflies computation and I/O data. Exclusive of [B4], all of the others, only this invention and [A1] can support the mixed of any general radix and then for any size FFT. However, [A1] could not support the multi-bank memory structure without memory conflict to reduce the necessary clock rate for real-time application.

In this invention, the inventors propose the approach for memory based FFT processor design such that it could support the following three items simultaneously: (1) the in-place policy for both butterflies computation and I/O data (2) the mixed of any radix (3) the multi-bank memory structure.

TABLE II

THE COMPARISON BETWEEN DIFFERENT APPROACH

|  | [A1] | [A2] [B2] [A5] | [A3] | [A4] B[3] | This invention |
|---|---|---|---|---|---|
| Radix | All general | Fixed radix-r | Fixed radix-r | Radix-2/4 | All general |
| In-place | Yes | Yes | Yes | Yes | Yes |
| Memory | 2N words | 2N words | 2N words | 2N words | 2N words |
| Multi-bank | No | Yes | No | Yes | Yes |

When this invention apply the proposed for the 3780-point DFT in Chinese DTV application, this invention could use only 2N words memory to achieve the system requirement, continuous data flow and in order I/O data. However, in order to achieve this, the solution [A6]-[A8] needs at least 3N words, [A9], [A11] needs at least 5N wo [A10] needs 6N words, and [B1] needs more than 3N words. Hence, for this application, if the 3780-point DFT processor is designed with this invention, the chip area could be reduced significantly than the processor which is designed with any current solution.

Although a preferred embodiment of the invention has been described for purposes of illustration, it is understood that various changes and modifications to the described embodiment can be carried out without departing from the scope of the invention as disclosed in the appended claims.

What is claimed is:

1. A memory-based FFT/IFFT processor comprises:
a main memory to store data;
a processing element for decomposed FFT computation;
a control unit to control: (1) the memory for I/O data and to control butterflies computation (2) computation order of the decomposed FFT (3) the memory addressing of the main memory for data access with in-place policy, wherein the function (3) of the control unit controls the data access with in-place policy for both the butterflies computation and the I/O data for each memory blocks; and wherein the address of accessed data is determined by the index vector (n$_1$, n$_2$. . . , n$_k$) and equation (a$_2$):

$$\text{address} = \sum_{i=1}^{k-2}\left(\prod_{j=i+1}^{k-1} U_j\right)u_i + u_{k-1} \bmod(N/M) \tag{a_2}$$

Here, N=N$_1$N$_2$ . . . N$_k$ and we take M=N$_t$ is one of {N$_1$, N$_2$, . . . , N$_k$}. And, (U$_1$, U$_2$, . . . , U$_{k-1}$)=(N$_1$, N$_2$, N$_{t-1}$, N$_{t+1}$, . . . , N$_k$), (u$_1$, u$_2$, . . . , u$_{k-1}$)=(n$_1$, n$_2$, . . . , n$_{t-1}$, n$_{t+1}$, . . . , n$_k$).

2. The memory-based FFT/IFFT processor as claimed in claim 1, wherein the main memory has two memory blocks MEM block1 and MEM block2, when MEM block1 is used for FFT computation, then, MEM block2 would be used for I/O data, and vice versa.

3. The memory-based FFT/IFFT processor as claimed in claim 2, wherein each of the memory blocks consists of M memory banks and the size of each bank is N/M; Wherein, N is the FFT size and M is the bank number which is determined by designer.

4. The memory-based FFT/IFFT processor as claimed in claim 1, wherein the processing element is designed such that it can compute the decomposed FFT individually.

5. The memory-based FFT/IFFT processor as claimed in claim 1, wherein the main memory has two memory blocks MEM block1 and MEM block2, when MEM block1 is used for FFT computation, then, MEM block2 would be used for I/O data, and vice versa and wherein the function (1) of the control unit controls the memory blocks to exchange their function for FFT computation or for I/O data.

6. The memory-based FFT/IFFT processor as claimed in claim 1, wherein the function (2) of the control unit controls the processing element to compute the FFT symbol with the decomposed FFT in the reverse decomposition order of the previous FFT symbol for the same memory block; that is, for each memory block, if the FFT symbol in one memory block is computed in the order N$_1$-point FFT, N$_2$-point FFT, . . . , and then N$_k$-point FFT, the computation order of the next FFT symbol, which is stored in this memory block, would be N$_k$-point FFT, N$_{(k-1)}$-point FFT, . . . , and then N$_1$-point FFT.

7. The memory-based FFT/IFFT processor as claimed in claim 1, wherein the function (2) of the control unit controls the processing element to compute the FFT symbol with decomposed FFT in the reverse decomposition order of the previous FFT symbol for the same memory block; that is, for each memory block, if the FFT symbol in one memory block is computed in the order N$_1$-point FFT, N$_2$-point FFT, . . . , and then $N_k$-point FFT, the computation order of the next FFT symbol, which is stored in this memory block, would be $N_k$-point FFT, $N_{(k-1)}$-point FFT, ..., and then $N_1$-point FFT and wherein the accessed data would appear in which memory bank is determined by the index vector ($n_1, n_2, ..., n_k$) and the equation ($a_1$), where, c in Eq. ($a_1$) is a constant integer, the index vector is corresponding to each decomposed FFT, $N_1$-point FFT, $N_2$-point FFT, ..., and $N_k$-point FFT;

$$\text{bank} = n_1 + n_2 + \ldots + n_k + c \bmod M \tag{$a_1$}$$

8. The memory-based FFT/IFFT processor as claimed in claim 7 wherein the index vector was generated by the decompose equations ($a_3$) and ($a_4$) in each stage with $N = N_1 N_2$. The input and output index are transformed by the input and output equations ($a_3$) and ($a_4$) respectively;

$$n = N_2 n_1 + A_2 n_2 \bmod N\, n_1,\ k_1 = 0, 1, \ldots, N_1 - 1 \tag{$a_3$}$$

$$k = B_1 k_1 + N_1 k_2 \bmod N\, n_2,\ k_2 = 0, 1, \ldots, N_2 - 1 \tag{$a_4$}$$

9. The memory-based FFT/IFFT processor as claimed in claim 1, wherein the index vector was generated by the decompose equations ($a_3$) and ($a_4$) in each stage with $N = N_1 N_2$. The input and output index are transformed by the input and output equations ($a_3$) and ($a_4$) respectively;

$$n = N_2 n_1 + A_2 n_2 \bmod N\, n_1,\ k_1 = 0, 1, \ldots, N_1 - 1 \tag{$a_3$}$$

$$k = B_1 k_1 + N_1 k_2 \bmod N\, n_2,\ k_2 = 0, 1, \ldots, N_2 - 1 \tag{$a_4$}$$

\* \* \* \* \*